US012598134B2

(12) United States Patent
Shpiner et al.

(10) Patent No.: US 12,598,134 B2
(45) Date of Patent: Apr. 7, 2026

(54) PACKET DISCARD NOTIFICATIONS

(71) Applicant: MELLANOX TECHNOLOGIES, LTD., Yokneam (IL)

(72) Inventors: Alexander Shpiner, Ramat Yishai (IL); Eran Gil Beracha, Tel Aviv (IL); Liron Mula, Herzliya (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 15 days.

(21) Appl. No.: 18/389,751

(22) Filed: Dec. 19, 2023

(65) Prior Publication Data

US 2025/0202808 A1      Jun. 19, 2025

(51) Int. Cl.
*H04L 45/74*        (2022.01)
*H04L 45/00*        (2022.01)

(52) U.S. Cl.
CPC ............ *H04L 45/38* (2013.01); *H04L 45/566* (2013.01); *H04L 45/74* (2013.01)

(58) Field of Classification Search
CPC ........ H04L 45/38; H04L 45/566; H04L 45/74
See application file for complete search history.

(56) References Cited

U.S. PATENT DOCUMENTS

| | | | |
|---|---|---|---|
| 10,834,006 B2 | 11/2020 | Levy et al. | |
| 10,997,007 B2 | 5/2021 | Rotem et al. | |
| 11,500,737 B2 | 11/2022 | Aibester et al. | |
| 11,570,118 B2 | 1/2023 | Levy et al. | |
| 2014/0153574 A1* | 6/2014 | Louzoun | H04L 1/188 |
| | | | 370/392 |
| 2021/0306166 A1 | 9/2021 | Piasetzky et al. | |

* cited by examiner

*Primary Examiner* — Soe Hlaing
(74) *Attorney, Agent, or Firm* — Sheridan Ross P.C.

(57) ABSTRACT

A device, communication system, and method are provided. In one example, a system for switch generated explicit packet discard notifications is described that includes circuits to detect a packet is to be dropped; extract information from the packet to be dropped; and generate a notification using the extracted information from the packet to be dropped. The system also includes an interface to send the generated notification to a source associated with the packet to be dropped, wherein the notification is generated and sent from a switch.

18 Claims, 5 Drawing Sheets

400

| Version | Priority | Flow Identifier | |
|---|---|---|---|
| Payload Length | | PSN | Hop Limit |
| Source (SIP) Address | | | |
| Destination (DIP) Address | | | |
| Extension headers | | | |

500

Transmit a plurality of packets
502

Detect a packet of the plurality of packets is to be dropped
504

Extract information from the packet to be dropped
506

Generate a notification using the extracted information
508

Send the notification to a source associated with the packet to be dropped
510

Retransmit dropped packet
512

PACKET DISCARD NOTIFICATIONS

FIELD OF THE DISCLOSURE

The present disclosure is generally directed to systems, methods, and devices for error checking and, in particular, switch generated explicit packet discard notifications.

BACKGROUND

Data may be split into multiple packets that are routed to their destination via multiple paths by hopping from router to router. One node may send multiple messages to another node, which needs to identify which packets belong together. Additionally, packets may arrive out of order. That can happen especially if two packets follow different paths to the destination. Packets can be corrupted, which means that for some reason, the received data no longer matches the originally sent data. Packets may also be lost due to problems in the physical layer or in routers' forwarding tables. If even one packet of a message is lost, it may be impossible to put the message back together in a way that makes sense. Similarly, packets might be duplicated due to accidental retransmission of the same packet. Transmission Control Protocol (TCP) and User Datagram Protocol (UDP) are data transport protocols for packet ordering, retransmission, and data integrity.

BRIEF SUMMARY

Transport-layer protocols (e.g., Transmission Control Protocol (TCP), Remote Direct Memory Access (RDMA), and User Datagram Protocol (UDP)) are data transport protocols for packet ordering, retransmission, and data integrity. Transport-layer protocols guarantee lossless data-transfer from A to B, by retransmitting data that is lost along the path. Some transport-layer protocols support out of order data transfer, such that a message transmitted from node A to node B is broken into multiple smaller packets that can be delivered between node A and node B, out of order. In such protocols, the receiver receives packets out of order, re-orders them, and sends an acknowledgement.

When a receiver receives packets out of order, it may be difficult to distinguish between a packet that is delayed by the network and is soon expected (e.g., a delayed packet); and a packet that was discarded (or otherwise lost) by the network (e.g., lost packet) and will never arrive. Since the receiver is uncertain whether a packet is delayed or lost, the receiver delays its retransmission request in order to prevent transmission of duplicate packets, which in turn causes high latency in event of packet discards. In other words, the uncertainty of whether a packet is delayed or lost causes high "tail latency," which impacts application performance, because an entire application running on thousands of nodes may be impacted from a single node delaying its retrans-mission message. Another issues is if the discarded packet is the last in a flow, the receiver will not be able to get an out-of-order packet at all, hence waiting for long retrans-mission times is unavoidable. Moreover, even without sce-narios of reordering or last packet discard, it is faster to retransmit the packet if the packet discard notification is sent from the switch, rather than waiting for a retransmission request from the receiving node and/or retransmission from the transmitting node (e.g., sender).

Before a switch discards a packet, the switch may extract information from the packet in order to inform either the transmitter, the receiver, or both of the packet discard. For example, a packet discard may be due to a lack of buffer space in the switch, and the switch is able to extract information from the packet before discarding it. Packet discards may also be due to physical layer errors or physical coding sublayer (PCS) errors, in which case it may not be possible to extract information prior to the packet discard. In embodiments, the present disclosure may be able to deter-mine the specific sender and/or recipient of the discarded packet. In other embodiments, it may not be possible to determine the sender and/or recipient of the discarded packet (e.g., if the packet is corrupted). If the sender and/or recipi-ent of the discarded packet can be determined, the switch may notify the sender and/or recipient of the discarded packet to request retransmission.

In embodiments, a switch may determine information regarding the sender and/or receiver of the discarded packet, and send a notification to the sender and/or receiver. For example, one or more of a packet sequence number (PSN), a Source Queue Pair Number (QPN) or flow identifier, a source Internet Protocol (SIP) address, and/or a destination Internet Protocol (DIP) address may be extracted from a packet before the packet is discarded. Using the extracted information, the switch may identify the sender and/or receiver. Additionally, the switch may use the extracted information to generate a notification (e.g., a packet) to be sent to the sender and/or receiver. Advantageously, the switch may create the notification packet in the same format that is used by the receiver to indicate packet discard. After sender(s) and/or receiver(s) receive the notification from the switch, the sender may automatically retransmit the dis-carded packet. Alternatively, the receiver may request retransmission of the discarded packet. In embodiments, the switch may send a retransmission request on behalf of the receiver.

In accordance with one or more embodiments described herein, a network device, such as a switch, may enable a diverse range of nodes, such as switches, servers, personal computers, and other computing devices, to communicate across a network. Ports of the network device may function as communication endpoints, allowing the network device to manage multiple simultaneous network connections with one or more nodes.

Each port of the network device may be considered a lane and may be associated with an egress queue of data, such as in the form of packets, waiting to be sent via the port. In effect, each port may serve as an independent channel for data communication to and from the network device. Each port of the network device may be connected to one or more ports of one or more other devices. Ports allow for concur-rent network communications, enabling the network device to engage in multiple data exchanges with different network nodes simultaneously.

Load balancing of network traffic between multiple paths is conventionally a computationally difficult task. Consider a network switch receiving packets from one or more sources. Each packet flowing through the switch is associ-ated with a particular destination. In simple topologies, there may be a single port of the switch which the packet must be sent from to reach the destination. However, in modern network topologies, such as clusters of graphics processing units (GPUs) used for artificial intelligence (AI) related tasks, there may be many possible ports from which a packet may be transmitted to reach an associated destination. As a result, a decision must be made as to which one of many possible ports should transmit each packet due to the exis-tence of multiple paths in the network. A goal of a switch in such a scenario in many applications is to route packets toward a destination in such a way as to provide maximal total throughput and avoid congestion.

The present disclosure describes a system and method for switch generated explicit packet discard notifications. Embodiments of the present disclosure aim to solve the above-noted shortcomings and other issues by implementing an improved approach to detecting discarded packets. Systems and methods as described herein reduce retransmission latency and other issues arising from packet discards.

The approach depicted and described herein may be applied to any suitable type of device known or yet to be developed. In an illustrative example, a method is disclosed that includes detecting a packet is to be dropped; extracting information from the packet to be dropped; generating a notification using the extracted information from the packet to be dropped; and sending the generated notification to a source associated with the packet to be dropped, wherein the notification is generated and sent from a switch.

In another example, a system is disclosed that includes one or more circuits to transmit a plurality of packets over a communication network; detect a packet of the plurality of packets is to be dropped; extract information from the packet to be dropped; and generate a notification using the extracted information from the packet to be dropped; and an interface to send the generated notification to a source associated with the packet to be dropped, wherein the notification is generated and sent from the switch.

In yet another example, a device is disclosed that includes processing circuitry to detect a packet is to be dropped; extract information from the packet to be dropped; generate a notification using the extracted information from the packet to be dropped; and an interface to detect a network error; and send the generated notification to a source associated with the packet to be dropped, wherein the notification is generated and sent from a switch.

Any of the above example aspects include disabling sending a notification on out of sequence arrival on destination network interface controllers (NICs).

Any of the above example aspects include wherein the notification comprises an Out of Sequence (OOS) Negative Acknowledgement (NACK) message.

Any of the above example aspects include wherein the plurality of packets are routed based on congestion control protocols.

Any of the above example aspects include wherein the notification comprises a notification to request retransmissions.

Any of the above example aspects include wherein the information extracted from the packet to be dropped comprises a packet sequence number (PSN).

Any of the above example aspects include wherein the information extracted from the packet to be dropped comprises a flow identifier.

Any of the above example aspects include wherein the information extracted from the packet to be dropped comprises a source Internet Protocol (SIP) address and/or a destination Internet Protocol (DIP) address.

Any of the above example aspects include wherein the packet to be dropped is dropped based on a switch packet discard decision.

Any of the above example aspects include wherein the notification comprises an Out of Sequence (OOS) Negative Acknowledgement (NACK) message, and further comprising disabling an Out of Sequence (OOS) negative acknowledgement (NACK) on destination network interface controllers (NICs).

Any of the above example aspects include wherein the information extracted from the packet to be dropped comprises at least one of: a packet sequence number (PSN), a Source Queue Pair Number (QPN) or flow identifier, a source Internet Protocol (SIP) address, and/or a destination Internet Protocol (DIP) address.

Any of the above example aspects include wherein the information extracted from the packet to be dropped comprises at least one of: a packet sequence number (PSN) and a Source Queue Pair Number (QPN) or flow identifier.

Any of the above example aspects include wherein the information extracted from the packet to be dropped comprises a source Internet Protocol (SIP) address and/or a destination Internet Protocol (DIP) address.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

Further areas of applicability will become apparent from the detailed description provided hereinafter. It should be understood that the detailed description and various examples, while indicating various embodiments, are intended for purposes of illustration only and are not intended to limit the scope of the description or the appended claims.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
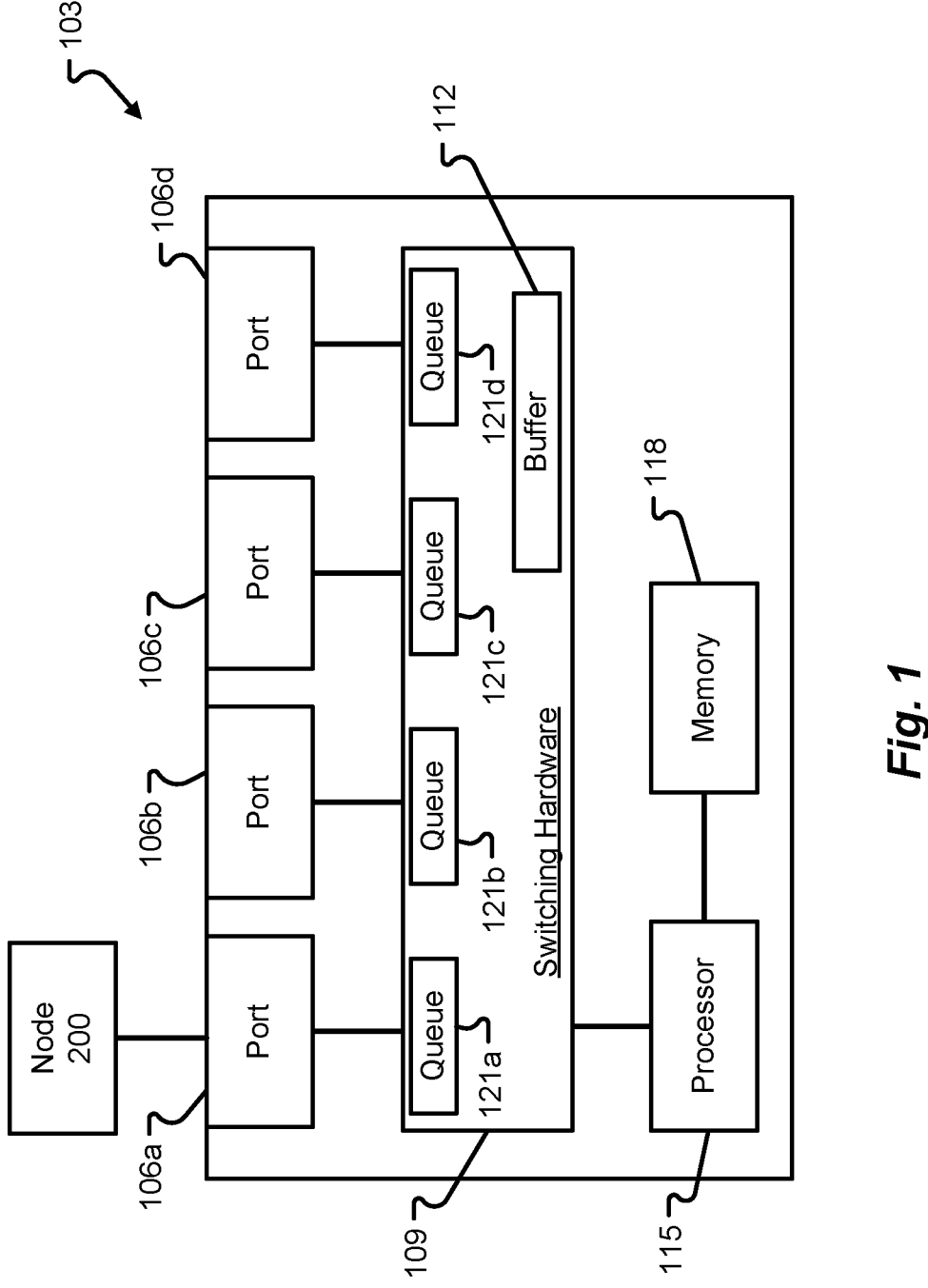
FIG. 1 is a block diagram depicting an illustrative configuration of a computing system in accordance with at least some embodiments of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The details of one or more aspects of the disclosure are set forth in the accompanying drawings and the description below. Other features, objects, and advantages of the techniques described in this disclosure will be apparent from the description and drawings, and from the claims.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

The ensuing description provides embodiments only, and is not intended to limit the scope, applicability, or configuration of the claims. Rather, the ensuing description will provide those skilled in the art with an enabling description for implementing the described embodiments. It is understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably, and include any appropriate type of methodology, process, operation, or technique.

Various aspects of the present disclosure will be described herein with reference to drawings that are schematic illustrations of idealized configurations.

Any of the steps, functions, and operations discussed herein can be performed continuously and automatically.

The exemplary systems and methods of this disclosure have been described in relation to a network of switches; however, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-4, various systems, and methods for switch generated explicit packet discard notifications and retransmission requests between communication nodes will be described. The concepts of packet routing depicted and described herein can be applied to the routing of information from one computing device to another. The term packet as used herein should be construed to mean any suitable discrete amount of digitized information. The information being routed may be in the form of a single packet or multiple packets without departing from the scope of the present disclosure. Furthermore, certain embodiments will be described in connection with a system that is configured to make centralized routing decisions whereas other embodiments will be described in connection with a system that is configured to make distributed and possibly uncoordinated routing decisions. It should be appreciated that the features and functions of a centralized architecture may be applied or used in a distributed architecture or vice versa.

In accordance with one or more embodiments described herein, a computing system 103 as illustrated in FIG. 1 may enable a diverse range of systems, such as switches, servers, personal computers, and other computing devices, to communicate across a network. Such a computing system 103 as described herein may for example be a switch or any computing device comprising a plurality of ports 106*a-d* for connecting with nodes on a network.

The ports 106*a-d* of the computing system 103 may function as communication endpoints, allowing the computing system 103 to manage multiple simultaneous network connections with one or more nodes. Each port 106*a-d* may be used to transmit data associated with one or more flows.

Each port 106*a-d* may be associated with a queue 121*a-d* enabling the port 106*a-d* to handle incoming and outgoing data packets associated with flows.

Each port 106*a-d* of the computing system may be considered a lane and be associated with a respective egress queue 121*a-d* of data, such as in the form of packets, waiting to be sent via the port 106*a-d*. In effect, each port 106 may serve as an independent channel for data communication to and from the computing system 103. Ports 106*a-d* allow for concurrent network communications, enabling the computing system 103 to engage in multiple data exchanges with different network nodes simultaneously. As a packet or other form of data becomes ready to be sent from the computing system 103, the packet may be assigned to a port 106 from which the packet will be sent by being stored in a queue 121 associated with the port 106.

The ports 106*a-d* of the computing system 103 may be physical connection points which allow network cables such as Ethernet cables to connect the computing system 103 to one or more network nodes. Each port 106*a-d* may be of a different type, including, for example, a 100 Mbps, 1000 Mbps, or 10-Gigabit Ethernet port, each providing different levels of bandwidth.

Because each port 106*a-d* may be used to send a particular packet, when a packet is received, created, or otherwise handled by the computing system 103 and is to be transmitted from the computing system 103, one or more ports 106*a-d* of a computing system 103 may be selected to transmit the packet. Transmitting a packet from a port 106*a-d* may comprise placing the data in a queue 121*a-d* associated with the other port 106*a-d*.

Switching hardware 109 of the computing system may comprise an internal fabric or pathway within the computing system 103 through which data travels between two ports 106*a-d*. The switching hardware 109 may in some embodiments comprise one or more network interface cards (NICs). For example, in some embodiments, each port 106*a-d* may be associated with a different NIC. The NIC or NICs may comprise hardware and/or circuitry which may be used to transfer data between ports 106*a-d*.

Switching hardware 109 may also or alternatively comprise one or more application-specific integrated circuits (ASICs) to perform tasks such as determining to which port a received packet should be sent. The switching hardware 109 may comprise various components including, for example, port controllers that manage the operation of individual ports, network interface cards that facilitate data transmission, and internal data paths that direct the flow of data within the computing system 103. The switching hardware 109 may also include memory elements to temporarily store data and management software to control the operation of the hardware. This configuration could enable the switching hardware 109 to accurately track port usage and provide data to the processor 115 upon request.

Packets received by the computing system 103 may be placed in a buffer 112 (e.g., a shared buffer) until being placed in a queue 121*a-d* before being transmitted by a respective port 106*a-d*. The buffer 112 may effectively be an ingress queue where received data packets may temporarily be stored. As described herein, the ports 106*a-d* via which a given packet is to be sent may be determined based on a number of factors.

As illustrated in FIG. 1, the computing system 103 may also comprise a processor 115, such as a CPU, a microprocessor, or any circuit or device capable of reading instructions from memory 118 and performing actions. The processor 115 may execute software instructions to control operations of the computing system 103.

The processor 115 may function as the central processing unit of the computing system 103 and execute the system's operative capabilities. Processor 115 communicates with other components of the computing system 103 to manage and perform computational operations, ensuring optimal system functionality and performance.

In further detail, the processor 115 may be engineered to perform a wide range of computational tasks. Its capabilities may encompass executing program instructions, managing data within the system, and controlling the operation of other hardware components such as switching hardware 109. The processor 115 may be a single-core or multi-core processor and might include one or more processing units, depending on the specific design and requirements of the computing system 103. The architectural design of the processor 115 may allow for efficient instruction execution, data processing, and overall system management, thereby enhancing the computing system 103's performance and utility in various applications. Furthermore, the processor 115 may be programmed or adapted to execute specific tasks and operations according to application requirements, thus potentially enhancing the versatility and adaptability of the computing system 103.

The computing system 103 may further comprise one or more memory 118 components. Memory 118 may be configured to communicate with the processor 115 of the computing system 103. Communication between memory 118 and the processor 115 may enable various operations, including but not limited to, data exchange, command execution, and memory management.

The memory 118 may be constituted by a variety of physical components, depending on the specific type and design. At the core, memory 118 may include one or more memory cells capable of storing data in the form of binary information. These memory cells may be made up of transistors, capacitors, or other suitable electronic components depending on the memory type, such as DRAM, SRAM, or Flash memory. To enable data transfer and communication with other parts of the computing system 103, memory 118 may also include data lines or buses, address lines, and control lines. Such physical components may collectively constitute the memory 118, contributing to its capacity to store and manage data.

Data stored in memory 118 may encompass information about various aspects of port, buffer, and system usage. Such information might include data about active connections, amount of data in queues 121*a-d*, amount of data in the buffer 112, statuses of each port within the ports 106*a-d*, among other things. Data may include, for example, buffer-occupancy, a number of active ports 106*a-d*, a number of total ports 106*a-d*, and a queue depth or length for each port 106*a-d*, as described in greater detail herein. The data may be stored, accessed, and utilized by the processor 115 in managing port operations and network communications. For example, the processor 115 might utilize the data in memory 118 to manage network traffic, prioritize, or otherwise control the flow of data through the computing system 103 as described in greater detail herein. Therefore, the memory 118, in potential conjunction with the processor 115, may play a crucial role in optimizing the usage and performance of the ports 106 of the computing system 103.

Data stored in memory 118 may include various metrics such as amount of data or a number of packets in each queue 121*a-d*, an amount of data or a number of packets in the buffer 112, and/or other information, such as data transmission rates, error rates, and status of each port. The processor 115, after receiving this data, might perform further operations based on the obtained information, such as optimizing port usage, balancing network load, or troubleshooting issues, as described herein.

Figure 2:
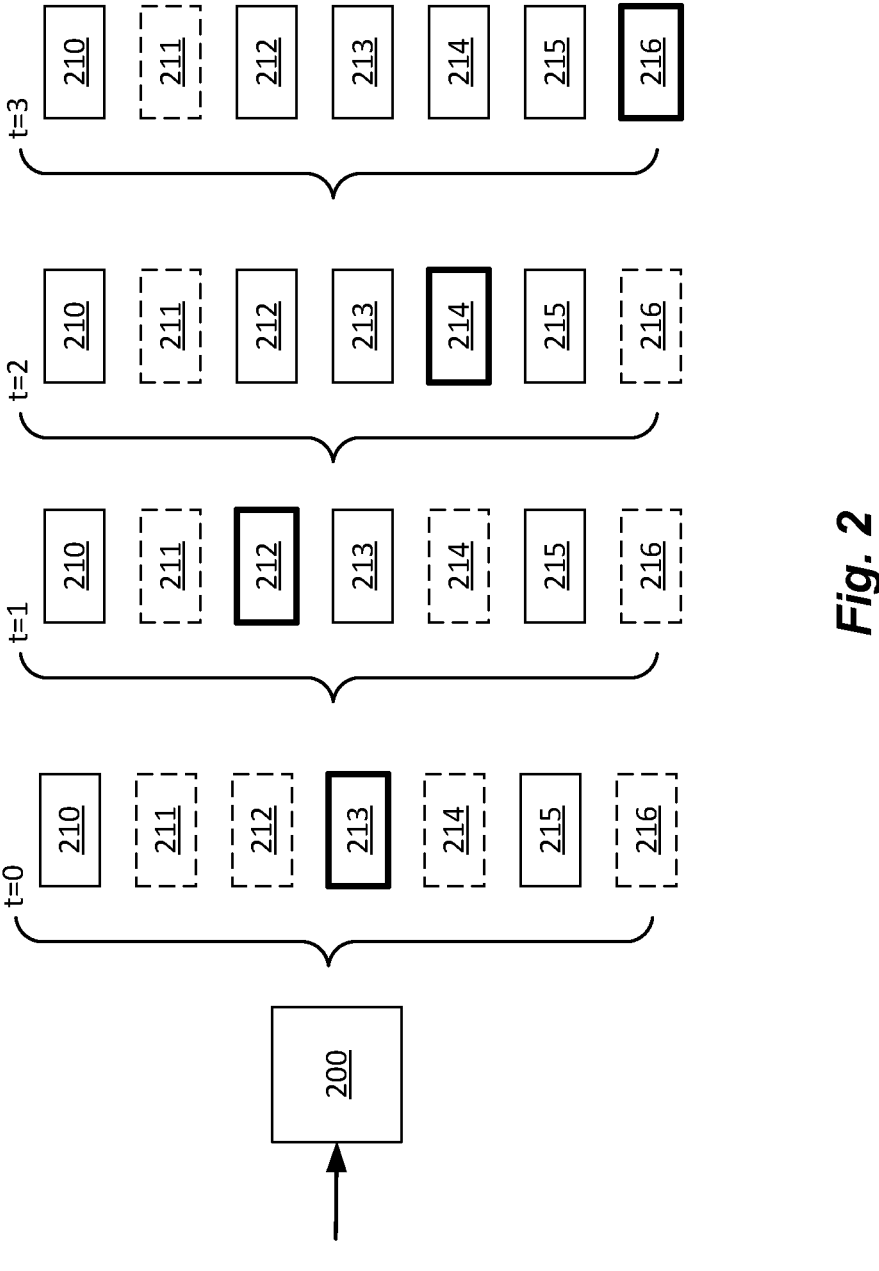
FIG. 2 illustrates a block diagram depicting out of order packet transfers in accordance with at least some embodiments of the present disclosure.

In one or more embodiments of the present disclosure, a computing system 103, such as a switch, may be in communication with a plurality of network nodes 200 as illustrated in FIG. 2. Each network node 200 may be a computing system with capabilities for sending and receiving data. Each node 200 may be any one of a broad range of devices, including but not limited to switches, personal computers, servers, or any other device capable of transmitting and receiving data in the form of packets.

The computing system 103 may establish communication channels with the network nodes 200 via the ports 106*a-f*. Such channels may support data transfer in the form of flows of packets, following predetermined protocols that govern the format, size, transmission method, and other aspects of the packets.

Each network node 200 may interact with the computing system 103 in various ways. A node 200 may send data packets to the computing system 103 for processing, transmission, or other operations, or for forwarding to another node 200. Conversely, each node 200 may receive data from the computing system 103, originating from either the computing system 103 itself or other network nodes 200 via the computing system 103. In this way, the computing system 103 and nodes 200 could collectively form a network, facilitating data exchange, resource sharing, and a host of other collaborative operations.

Nodes 200 may be connected to a plurality of computing systems 103 forming a network of nodes 200 and computing systems 103. For example, the systems and methods described herein may comprise a plurality of interconnected switches. Multiple computing systems 103, such as switches, can be interconnected in a variety of topologies, such as star, ring, or mesh, depending upon the specific requirements and resilience needed for the network. For instance, in a star topology, a plurality of switches may be connected to a central switch, whereas in a ring topology, each switch may be connected to two other switches in a closed loop. In a mesh topology, each switch may be interconnected with every other switch in the network.

FIG. 2 illustrates out of order transfers, node 200 receives packets (e.g., packets 210-216). The packets may be received out-or-order as illustrated. At t=0, receiver node 200 has received packets 210, 213, and 215. As indicated by the bolded line, packet 213 was the most recently received packet. At t=0, the receiver node 200 is still awaiting packets 211, 212, 214, and 216. In some cases, packets 211 and 212 are delayed. However, either or both of packets 211 and 212 may be discarded, and therefore will never be received. In the case of a discarded packet, the receiver node 200 may wait for a predetermined period before requesting retransmission.

At t=1, packet 212 is received. At t=2, packet 214 is received. At t=3, packet 216 is received. At t=3, the receiver node 200 is still awaiting packet 211. In embodiments, when packet 211 is discarded, the computing device notifies the receiver node 200 of the discarded packet, so that the receiver node 200 is able to immediately request retransmission instead of waiting until a later time (e.g., t=4).

Figure 3:
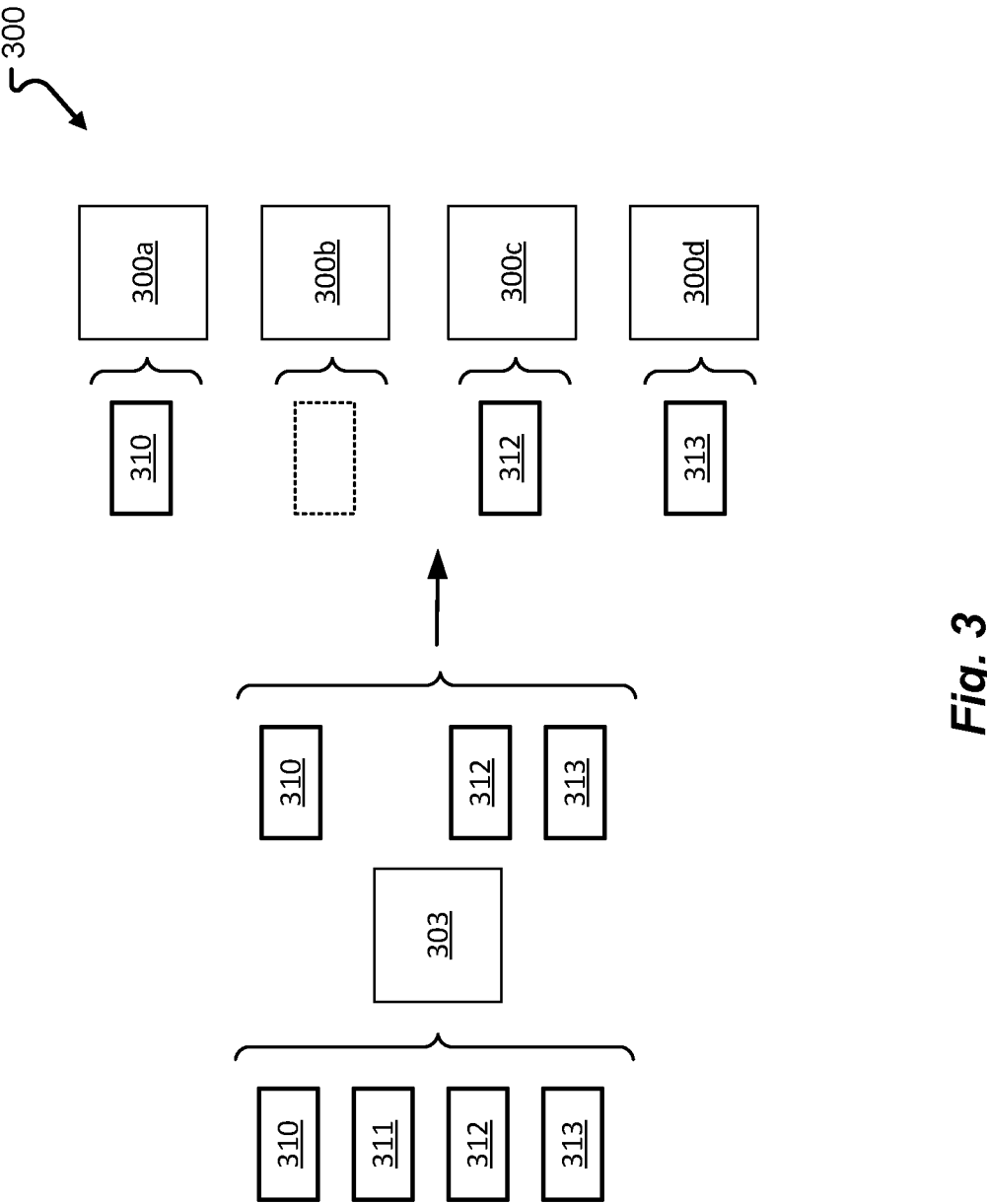
FIG. 3 illustrates a block diagram depicting switch generated explicit packet discard notifications in accordance with at least some embodiments of the present disclosure.

FIG. 3 illustrates a system 300 in which explicit packet discard notifications may be generated by a switch 303. As illustrated in FIG. 3, the switch 303 receives packets 310-313. The packets 310-313 may be from one or more connected nodes. The switch 303 may transmit the packets 310-313 to nodes 300*a-d*, respectively. Starting from the left side of FIG. 3, the packets 310-313 are transmitted to the switch 303. As the packets 310-313 traverse the switch 303, the packet 311 is dropped/discarded by the switch 303.

Before the switch 303 discards the packet 311, the switch 303 may extract information from the packet 311 in order to inform either the transmitter (e.g., source), the receiver (e.g., destination), or both of the packet discard. For example, the switch 303 may use a SIP address to identify the transmitter of the packet 311. In another example, the switch 303 may use a DIP address to identify a receiver of the packet 311.

Using the extracted information, the switch 303 may generate a notification (e.g., a packet) to be sent to the transmitter and/or receiver of the packet 311. After sender(s) and/or receiver(s) receive the notification from the switch 303, the sender may automatically retransmit the packet 311. Alternatively, the receiver may request retransmission of the packet 311. In embodiments, the switch 303 may send a retransmission request for the packet 311 on behalf of the receiver.

Figure 4:
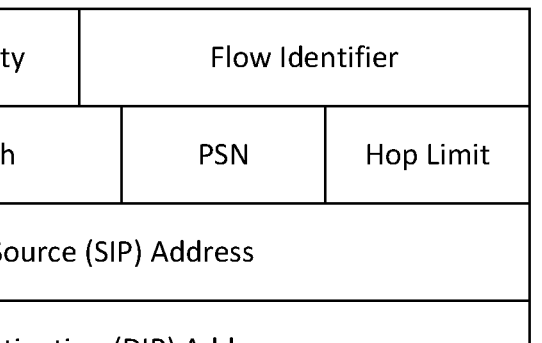
FIG. 4 illustrates an example packet header in accordance with at least some embodiments of the present disclosure.

FIG. 4 illustrates an example packet header 400. The packet header 400 may include various types of information. In embodiments, the packet header 400 may include information, such as, but not limited to a packet sequence number (PSN), a Source Queue Pair Number (QPN) or flow identifier, a source Internet Protocol (SIP) address, and/or a destination Internet Protocol (DIP) address. In the event of a packet discard, information from the packet header 400 may be extracted by the switch 303 in order to generate a notification to inform the sender and/or receiver of the packet discard. A size of a packet as described herein may be measured in bits or bytes. The size of a packet may depend on, for example, a size of a payload of the packet. For example, packets generated by an application may include various sizes of payloads.

Figure 5:
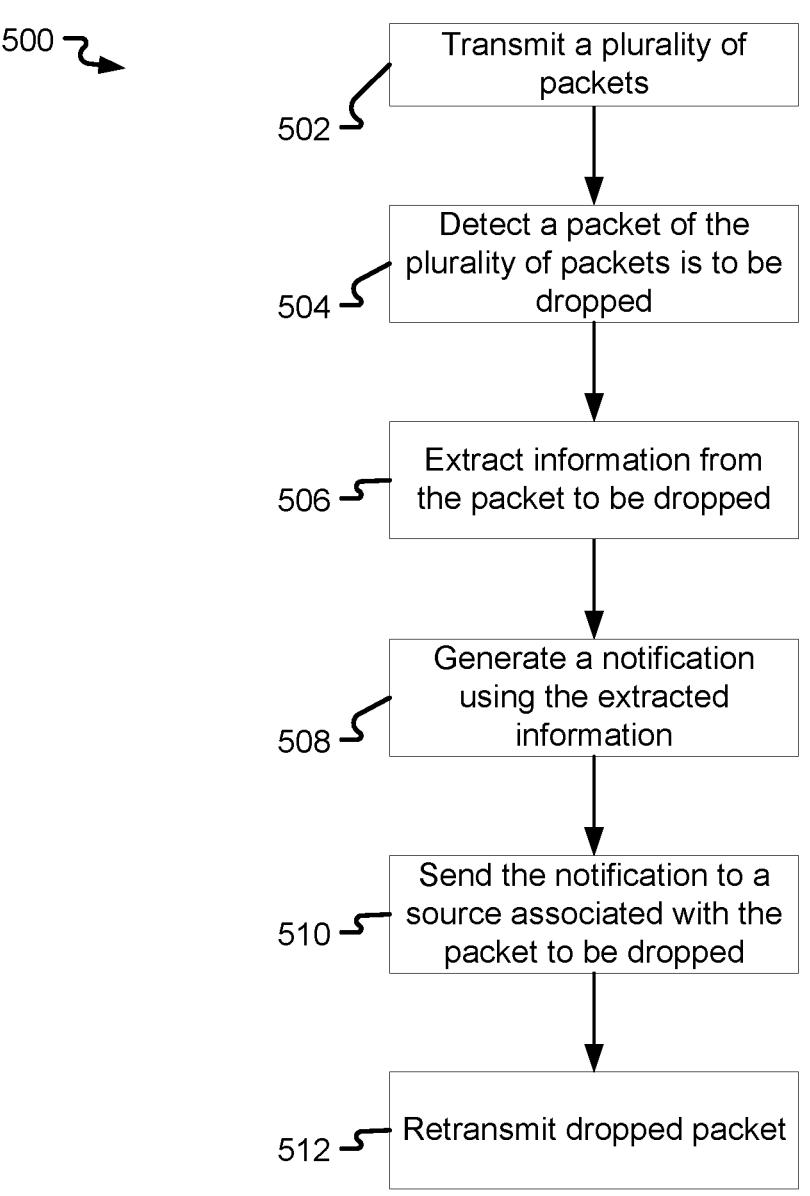
FIG. 5 is a flow diagram depicting a method in accordance with at least some embodiments of the present disclosure.

As illustrated in FIG. 5, and in accordance with a computing system 103 or the switch 303 as illustrated in FIGS. 1 and 3, and as described herein, a method 500 may be performed by a switch to generate explicit packet discard notifications. While the description of the method 500 provided herein describes steps of the method 500 as being performed by a processor 115 of the computing system 103, the steps of the method 500 may be performed by one or more processors 115, switching hardware 109, one or more controllers, one or more circuits in the computing system 103, packet senders, packet receivers, or some combination thereof. As should be appreciated, the method 500 may be implemented through hardware or software.

While the description of the method 500 provided herein describes steps of the method 500 as being performed by a processor 115 of the computing system 103, the steps of the method 500 may be performed by one or more processors 115, hardware, one or more controllers, one or more circuits in the computing system 103, or some combination thereof. As should be appreciated, the method 500 may be implemented through hardware or software.

At 502, the method 500 may begin with a processor 115 of a computing system 103 transmitting a plurality of packets. At 504, the processor 115 may detect that a packet of the plurality of packets is to be discarded or dropped. Advantageously, having the network device that discards the packet, detect and notify the sender/receiver of the discard, reduces latency associated with retransmission requests. In other words, the node awaiting a discarded packet does not have to wait to request retransmission. Before dropping or discarding the packet, the processor 115 at 506 extracts information such as a packet sequence number (PSN), a Source Queue Pair Number (QPN) or flow identifier, a source Internet Protocol (SIP) address, and/or a destination Internet Protocol (DIP) address from a packet header.

Using the extracted information, the processor 115 at 508 generates a notification. At 510, the processor 115 sends the notification to a source associated with the packet(s) to be dropped/dropped packet(s). In response to receiving the notification, the source may initiate retransmission of the discarded packet at 512. Alternatively, the processor 115, at 510, may send the notification to a destination associated with the dropped packet; and at 512, the destination may request retransmission of the dropped packet.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMS, EPROMS, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® 15-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

It is to be appreciated that any feature described herein can be claimed in combination with any other feature(s) as described herein, regardless of whether the features come from the same described embodiment.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system, comprising:
a switch to route a plurality of packets over a communication network, the switch comprising processing circuitry to:
detect that a packet of the plurality of packets will arrive out of sequence at a destination;
extract information from the detected packet; and
generate a notification using the extracted information; and
an interface to send the notification to a source associated with the plurality of packets wherein the notification comprises an Out of Sequence (OOS) Negative Acknowledgement (NACK) message which informs the source that the detected packet will arrive out of sequence at the destination.

2. The system according to claim 1, wherein sending of the OOS NACK is disabled on destination network interface controllers (NICs).

3. The system according to claim 1, wherein the plurality of packets are routed based on congestion control protocols.

4. The system according to claim 1, wherein the notification comprises a notification to request retransmissions.

5. The system according to claim 1, wherein the information extracted from the detected packet comprises a packet sequence number (PSN).

6. The system according to claim 1, wherein the information extracted from the detected packet comprises a flow identifier.

7. The system according to claim 1, wherein the information extracted from the detected packet comprises a source Internet Protocol (SIP) address and/or a destination Internet Protocol (DIP) address.

8. The system according to claim 1, wherein the detected packet is dropped based on a switch packet discard decision.

9. A switch, comprising:

processing circuitry to:

detect that a packet of a plurality of packets will arrive out of sequence at a destination;

extract information from the detected packet;

generate a notification using the extracted information; and send the notification to a source associated with the plurality of packets, wherein the notification comprises an Out of Sequence (OOS) Negative Acknowledgement (NACK) message which informs the source that the detected packet will arrive out of sequence at the destination.

10. The switch according to claim 9, wherein the OOS NACK is disabled on destination network interface controllers (NICs).

11. The switch according to claim 9, wherein the detected packet is routed based on congestion control.

12. The switch according to claim 9, wherein the information extracted from the detected packet comprises at least one of: a packet sequence number (PSN), a Source Queue Pair Number (QPN) or flow identifier, a source Internet Protocol (SIP) address, and/or a destination Internet Protocol (DIP) address.

13. A method, comprising:

detecting, at a switch, that a packet of a plurality of packets will arrive out of sequence at a destination;

extracting, at the switch, information from the detected packet;

generating, at the switch, a notification using the extracted information; and sending, at the switch, the notification to a source associated with the plurality of packets, and wherein the notification comprises an Out of Sequence (OOS) Negative Acknowledgement (NACK) message which informs the source that the detected packet will arrive out of sequence at the destination.

14. The method according to claim 13, further comprising:

disabling transmission of the OOS NACK on destination network interface controllers (NICs).

15. The method according to claim 13, wherein the packet is routed based on congestion control.

16. The method according to claim 13, wherein the notification comprises a notification to request retransmission.

17. The method according to claim 13, wherein the information extracted from the detected packet comprises at least one of: a packet sequence number (PSN) and a Source Queue Pair Number (QPN) or flow identifier.

18. The method according to claim 13, wherein the information extracted from the detected packet comprises a source Internet Protocol (SIP) address and/or a destination Internet Protocol (DIP) address.

\*  \*  \*  \*  \*